United States Patent
Venable et al.

(10) Patent No.: US 9,094,540 B2
(45) Date of Patent: Jul. 28, 2015

(54) DISPLACING IMAGE ON IMAGER IN MULTI-LENS CAMERAS

(71) Applicant: Microsoft Corporation, Redmond, WA (US)

(72) Inventors: Morgan Venable, San Francisco, CA (US); Joe Corkery, Burlingame, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 410 days.

(21) Appl. No.: 13/713,025

(22) Filed: Dec. 13, 2012

(65) Prior Publication Data
US 2014/0168357 A1    Jun. 19, 2014

(51) Int. Cl.
*H04N 7/00* (2011.01)
*G03B 37/04* (2006.01)
(Continued)

(52) U.S. Cl.
CPC ............... *H04N 7/00* (2013.01); *G03B 37/04* (2013.01); *H04N 5/2254* (2013.01); *H04N 5/23238* (2013.01); *G03B 5/02* (2013.01); *G03B 5/04* (2013.01); *H04N 5/2258* (2013.01); *H04N 5/3696* (2013.01)

(58) Field of Classification Search
CPC ............ G03B 37/04; G03B 5/02; G03B 5/04; H04N 5/2254; H04N 5/2258; H04N 5/23238; H04N 5/3696; H04N 7/00
USPC ....................................................... 348/36–39
See application file for complete search history.

(56) References Cited

U.S. PATENT DOCUMENTS

| 5,668,595 A | 9/1997 | Katayama et al. |
| 5,739,852 A | 4/1998 | Richardson et al. |

(Continued)

FOREIGN PATENT DOCUMENTS

| EP | 2407809 A1 | 1/2012 |
| JP | 2011-124837 A | 6/2011 |

OTHER PUBLICATIONS

"Sunex 5.6mm f/5.6 SuperFisheye Fixed Focus Lens for Canon Digital SLR", Retrieved at <<http://www.bhphotovideo.com/c/product/549963-USA/Sunex_DSLR01C_5_6mm_f_5_6_SuperFisheye_Fixed.html>>, Retrieved Date: Jul. 13, 2012, pp. 2.

(Continued)

*Primary Examiner* — Gelek W Topgyal
(74) *Attorney, Agent, or Firm* — Steven Spellman; Jim Ross; Micky Minhas (57) ABSTRACT

Panoramic and spherical cameras often currently capture respective portions of a scene using a set of lenses that focus images on imagers for sampling by photosensitive elements. Because the images are often circular and imagers are often rectangular, the orientation of the lenses may be selected as a tradeoff between capturing capture the entire image while leaving unused portions of the imager, and maximizing imager coverage to increase resolution while creating cropped image portions that extend beyond the edges of the imager. The techniques presented herein involve displacing the image from the imager center in order to increase a first cropped area and reduce or eliminate a second cropped area. The lenses may also be oriented such that the first cropped area comprises a portion of the composite image that may be acceptable to omit from the composite image (e.g., the user's hand or a camera mounting apparatus).

20 Claims, 6 Drawing Sheets

(51) Int. Cl.
*H04N 5/232* (2006.01)
*H04N 5/225* (2006.01)
*G03B 5/02* (2006.01)
*G03B 5/04* (2006.01)
*H04N 5/369* (2011.01)

(56) References Cited

U.S. PATENT DOCUMENTS

| | | |
|---|---|---|
| 6,683,608 B2 | 1/2004 | Golin et al. |
| 7,123,292 B1 | 10/2006 | Seeger et al. |
| 7,176,960 B1 | 2/2007 | Nayar et al. |
| 7,382,399 B1 | 6/2008 | McCall et al. |
| 7,808,726 B2 | 10/2010 | Sueyoshi |
| 8,238,695 B1 * | 8/2012 | Davey et al. ............... 382/299 |
| 8,391,640 B1 * | 3/2013 | Jin ............................ 382/284 |
| 2005/0219714 A1 | 10/2005 | Nakayama |
| 2006/0072020 A1 * | 4/2006 | McCutchen ............... 348/218.1 |
| 2008/0036875 A1 * | 2/2008 | Jones et al. ............... 348/222.1 |
| 2008/0129857 A1 | 6/2008 | Vau et al. |
| 2008/0316301 A1 | 12/2008 | Givon |
| 2011/0211039 A1 * | 9/2011 | Krishnan et al. ............... 348/36 |
| 2012/0105578 A1 * | 5/2012 | Ohmiya et al. ............... 348/36 |
| 2013/0141526 A1 * | 6/2013 | Banta et al. ............... 348/38 |
| 2014/0063229 A1 * | 3/2014 | Olsson et al. ............... 348/84 |
| 2014/0078247 A1 * | 3/2014 | Shohara et al. ............... 348/38 |
| 2014/0168475 A1 | 6/2014 | Corkery et al. |
| 2014/0267586 A1 * | 9/2014 | Aguilar et al. ............... 348/36 |

OTHER PUBLICATIONS

"Sunex 5.6mm Fisheye" —Retrieved at <<http://www.kenrockwell.com/sunex/super-fisheye.htm>>, Retrieved Date: Jul. 13, 2012, pp. 13.

Krishnan, et al., "Towards a True Spherical Camera", Retrieved at <<http://www1.cs.columbia.edu/CAVE/publications/pdfs/Krishnan_SPIE09.pdf>>, Retrieved Date: Jul. 13, 2012, pp. 13.

Int. Search Report cited in PCT Application No. PCT/US2013/075147 dated Mar. 21, 2014, 12 pgs.

* cited by examiner

DISPLACING IMAGE ON IMAGER IN MULTI-LENS CAMERAS

BACKGROUND

Within the field of imaging, many scenarios involve a camera featuring a set of two or more lenses, each configured to focus an image on an imager, and where the images captured by the imagers are combined to form a composite image. As a first example, multiple images taken from parallel points of view may be combined to form a panoramic image having greater visual dimensions than any one image. As a second example, multiple images captured in different directions from a single point of view combined to generate a spherical image of an environment. In these scenarios, a fisheye lens may provide a wide field of view which reduces the number of images needed to complete the combined spherical panoramic image. The imager may comprise an array of photosensitive elements that capture respective portions of the image, such a charge-coupled device (CCD) imager of a digital camera that captures an array of pixels. The quality of the captured image may vary proportionally with the density of the photosensitive elements used to capture the image; e.g., an image focused on a higher-density CCD may result in the capturing of a larger number of pixels than focusing the same image on a lower-density CCD. The larger pixel count may enable a higher-resolution image presenting more detail and/or accuracy than a lower-resolution image.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

When capturing an image using a lens and an imager, it may be observed that a lens typically generates a circular image, but the imager provides a rectangular array of photosensitive elements. Typically, the focusing of a fisheye lens is selected to produce a circular image centered on the imager and having a diameter equal to the height and/or width of the imager, such that the circular image is expanded to meet the edges of the imager without extending past any edge of the imager, thus maximizing the coverage of the imager and achieving a high resolution while not losing any portion of the circular image. However, it may be appreciated that several portions of the imager are unutilized during this focusing of the lens, comprising the photosensitive elements provided in each corner of the rectangular imager. A higher resolution may be achievable by further expanding the image focused on the imager, but at the expense of some peripheral portions of the image falling off of the edge of the imager, resulting in a cropped image. These alternative options for adjusting the lens to focus of the image on the imager may provide a tradeoff between maximizing the resolution of the captured portion of the image and minimizing the peripheral cropping of the image.

However, it may be appreciated that this tradeoff may be evaluated differently in cameras configured to produce a composite image by combining images from multiple lenses. For example, in a camera featuring two fisheye lenses oriented in opposite directions and configured to capture a spherical image, it may be appreciated that a portion of the image is typically obscured (e.g., by the user's hand or a mounting apparatus) and of little value to the user. While cropping any other portion of the image may be unacceptable, cropping out this particular portion of the image may be acceptable, especially in exchange for enhanced resolution for the remainder of the image. Therefore, respective lenses may be configured to expand the image on the imager to create at least two cropped portions, and then to displace the image from the center of the imager in order to expand one cropped portion while reducing or eliminating the other cropped portions. These off-center displacement techniques may enable greater coverage of the imager by the image, thus providing greater resolution, while creating a cropped portion of the image presenting a blind spot that the user is not interested in capturing.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of imaging, many scenarios involve a camera comprising a plurality of lenses and configured to generate a composite image aggregating the images provided by the lenses. As a first example, the camera may comprise a panoramic camera that concurrently captures images representing several angles of an environment, and then aggregates the images into a panorama. While some image manipulation may have to be performed to reduce the spherical aberration of the images, the camera may nevertheless produce a comparatively flat panoramic image. As a second example, the camera may be configured to generate a spherical image, comprising images captured by two or more lenses pointing in opposite directions, and aggregated into an image representing the view wrapping around the viewpoint at the time that the images were captured.

In these and other scenarios, the camera may comprise one or more imagers that receive an image focused on the imager by at least one lens, samples the focused image(s) via photosensitive elements, and generates one or more images as output that may be aggregated into the composite image. For example, digital cameras often include a charge-coupled device (CCD), where the image is focused on a two-dimensional planar array of photosensitive elements that generate a two-dimensional array of pixels comprising the image. The images captured by the one or more CCDs may be combined (e.g., using image registration techniques to align the images) in order to generate the composite image.

Figure 1:
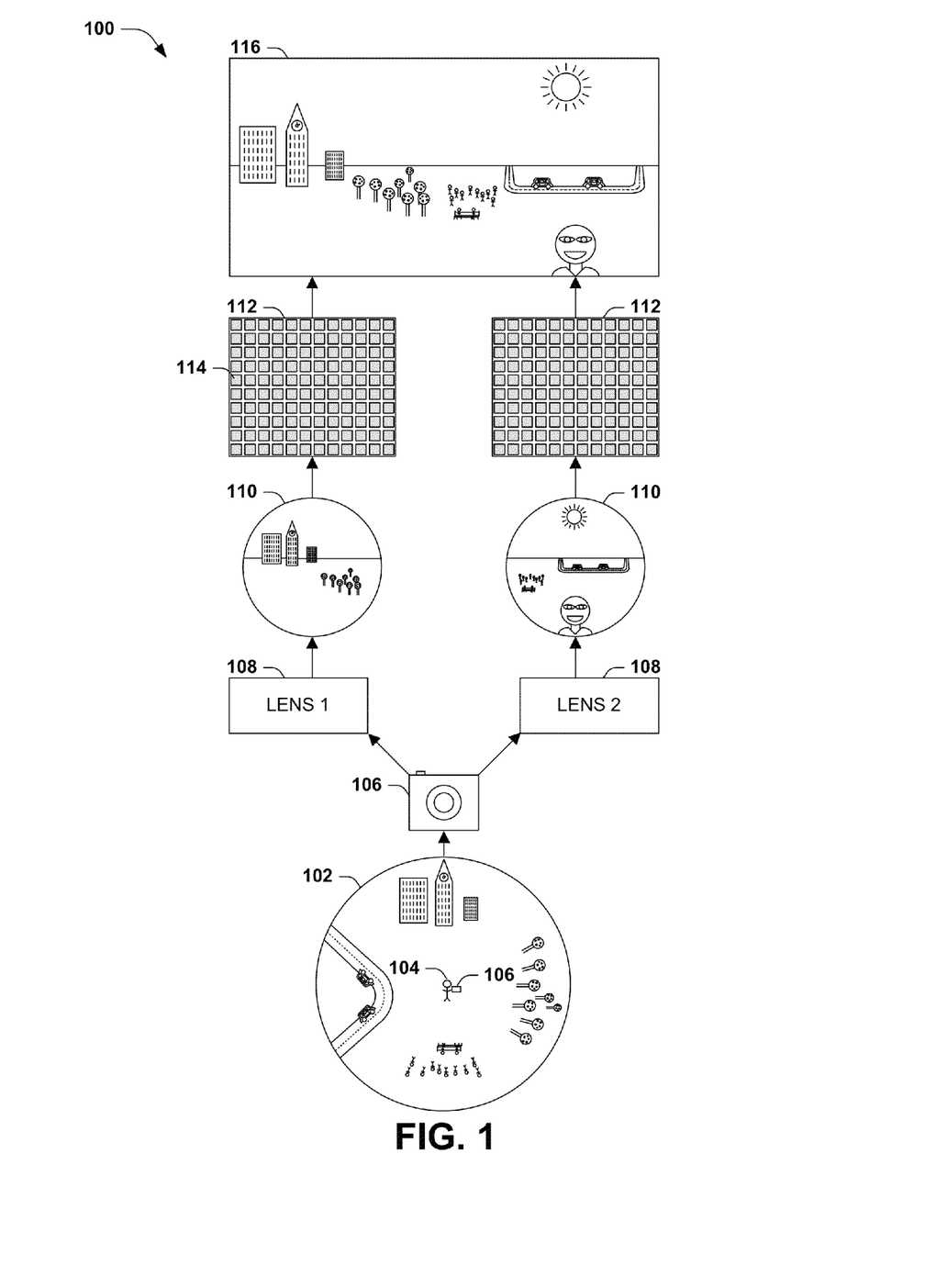
FIG. 1 is an illustration of a first exemplary scenario featuring the generation of a composite image from images captured by multiple lenses.

FIG. 1 presents an illustration of an exemplary scenario 100 featuring a camera 106 operated by a user 104 to capture a scene 102, such as the environment around the user 104. In this exemplary scenario 100, the camera 106 comprises two lenses 108, one facing forward and one facing backward, and each configured to capture an approximately 180-degree view of the scene 102. For example, the first lens 108 may capture a first image 110 representing the viewing sphere in front of the user 104, and the second lens 108 may capture a second image 110 representing the viewing sphere facing back toward the user 104. Each image 110 may be focused by the lens 108 upon an imager 112 comprising an array of photosensitive elements 114, each configured to sample a small portion of the image 110 and output a light reading as a pixel. The samplings recorded by the imagers 112 may then be combined to produce a composite image 116 featuring the viewing sphere around the user 104, often including the user 104 holding the camera 106. (While the composite image 116 is illustrated herein as a flattened image for simplicity, it may be appreciated that the composite image 116 may also be cylindrical and/or spherical, and may be presented in a user interface that enables the user to look around within the composite image 116.)

In these and other scenarios, the quality of the composite image 116 is often significantly related to the quality of the sampling generated by the imager 112. In particular, the density of the photosensitive elements of the imager 112 may directly affect the sampling of the image 110 focused thereupon; e.g., an image 110 of a particular size may be sampled at a higher level of detail by an imager 112 having a higher density of photosensitive elements 114. The higher density may provide increased resolution (e.g., visibility of increasingly small elements and details within the composite image 116), color accuracy (e.g., generating respective pixels of the composite image 116 as an averaging of several samples rather than one, thereby reducing sampling error and raising color accuracy), and/or sensitivity (e.g., enabling more photosensitive elements 114 to capture more light quanta during a brief period of time enables capturing more detail in lower-light environments, and/or a faster shutter speed that reduces blurring of fast-moving objects).

For at least these reasons, it may be desirable to maximize the use of the image 112 while capturing the image 110. A first such technique involves scaling up the size of the imager 112 and physically extending the focal distance of the lens 108, such that the image 110 may be cast over a larger-area imager 112 and therefore provide greater sampling. However, the applicability of this technique is limited by the interest in providing high-quality cameras of smaller dimensions (mitigating against the physical extension of the focal length) and at lower prices (mitigating against larger CCDs that are more expensive to fabricate). A second such technique involves generating imagers 112 with higher densities of photosensitive elements 114. While imagers 112 have become steadily more dense through continuous research and development, it may be desirable to maximize the utilizing of any particular imager 112 given the current state of the art in this field.

Figure 2:
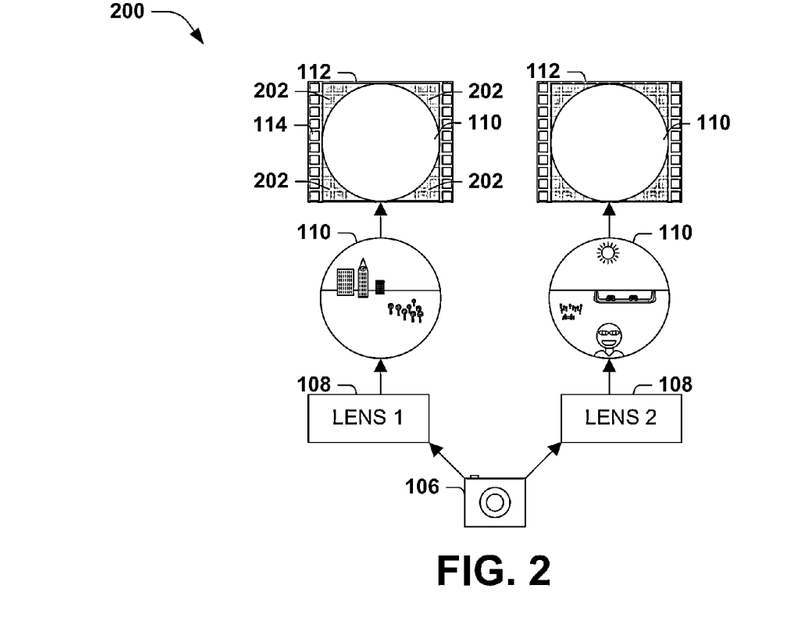
FIG. 2 is an illustration of a second exemplary scenario featuring the generation of a composite image from a set of images captured by two lenses and projected onto two imagers.

FIG. 2 presents an illustration of an exemplary scenario 200 featuring a camera 106 utilizing a first set of lenses 108 to focus an image 110 on an imager 112. In this exemplary scenario 200, the images 110 produced by the fisheye lenses 108 are circular, and the imager 112 is rectangular. The lenses 108 are therefore oriented to focus the image 110 on an imager 112 with a focal length selected such that the diameter of the image 110 is equal to the shorter side of the rectangular imager 112 (e.g., the height of the imager 112). That is, the image 110 is centered on the imager 112, and is expanded (by changing the focal length) until the edges of the circular image 110 meet the edges of the imager 112. This orientation of the lenses 108 therefore captures all of the image 110 with maximum coverage of the imager 112, thus maximizing the number of photosensitive elements 114 used to sample the image 110. However, it may be appreciated that several areas of the rectangular imager 112 remain unused, including the lateral edges of the rectangular imager 112, and the diagonal corners of the imager between the arc of the circle and the edge of the imager 112. These unused portions 202 include photosensitive elements 114 that are operational and provided as part of the manufactured imager 112, but that are unused during the capturing of the image 110.

Figure 3:
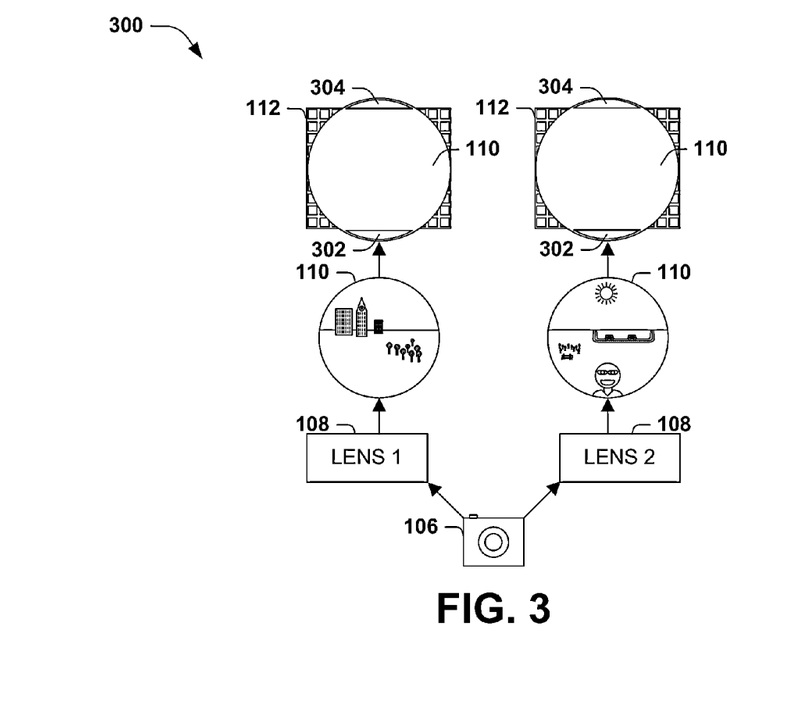
FIG. 3 is an illustration of a third exemplary scenario featuring the generation of a composite image from a set of images captured by two lenses and projected onto two imagers.

FIG. 3 presents an illustration of an exemplary scenario 300 featuring another technique for focusing the image 110 on the imager 112. In this exemplary scenario 300, the camera 106 again comprises two fisheye lenses 108 each capturing an image 110 that is focused in the center of an imager 112 comprising an array of photosensitive elements 114. However, in this exemplary scenario 300, the focal length of the image 110 is increased, thus providing a larger image 110 on the imager 112. Using the same imager 112 with the same density of photosensitive elements 114, this technique provides greater coverage of the imager 112, thus reducing the unused portions 202 of the imager 112 and increasing the number of photosensitive elements 114 used to sample the image 110. As a result, the resolution of the captured image is increased, resulting in a higher-quality composite image 116. However, this technique also results in a first cropped portion 302 of the image 110 and a second cropped portion 304 of the image, each extending past the edge of the imager 112, resulting in two "blind spots" in the composite image 116. For example, focusing the image 110 on the imager 112 in a manner that causes the top and bottom of each image 110 to miss the imager 112 and not be sampled may result in the composite image having cropped areas at the top and bottom. Arbitrary cropping may be highly undesirable to the user 104, and thus the techniques of FIGS. 2 and 3 represent a tradeoff between capturing the entire image 110 of the scene 102 and maximizing the resolution and quality of the composite image 116.

B. Presented Techniques

The techniques presented herein enable an alternative to the tradeoff provided in the comparison of FIGS. 2 and 3. It may be appreciated that the composite image 116 may include a portion that the user 104 is not particularly interested in capturing—specifically, the presence of the user 104 in the image. For example, this portion of the composite image 116 may depict an extreme close-up view of the user's hand while holding the camera, and/or a mounting apparatus providing support and stability for the camera 106 during the capturing. These areas of the composite image 116 may be undesirable to the user 104, and, in fact, the user 104 may often crop out these portions of the composite image 116 after capturing.

In view of this observation, it may be appreciated that omitting this portion of the composite image 116, in exchange for heightened resolution and image quality of the remainder of the composite image 116, may represent an acceptable tradeoff. To this end, the lenses 108 of the camera 106 may be oriented to maximize the resolution of the image 110 while cropping this specific portion of the image 110.

Figure 4:
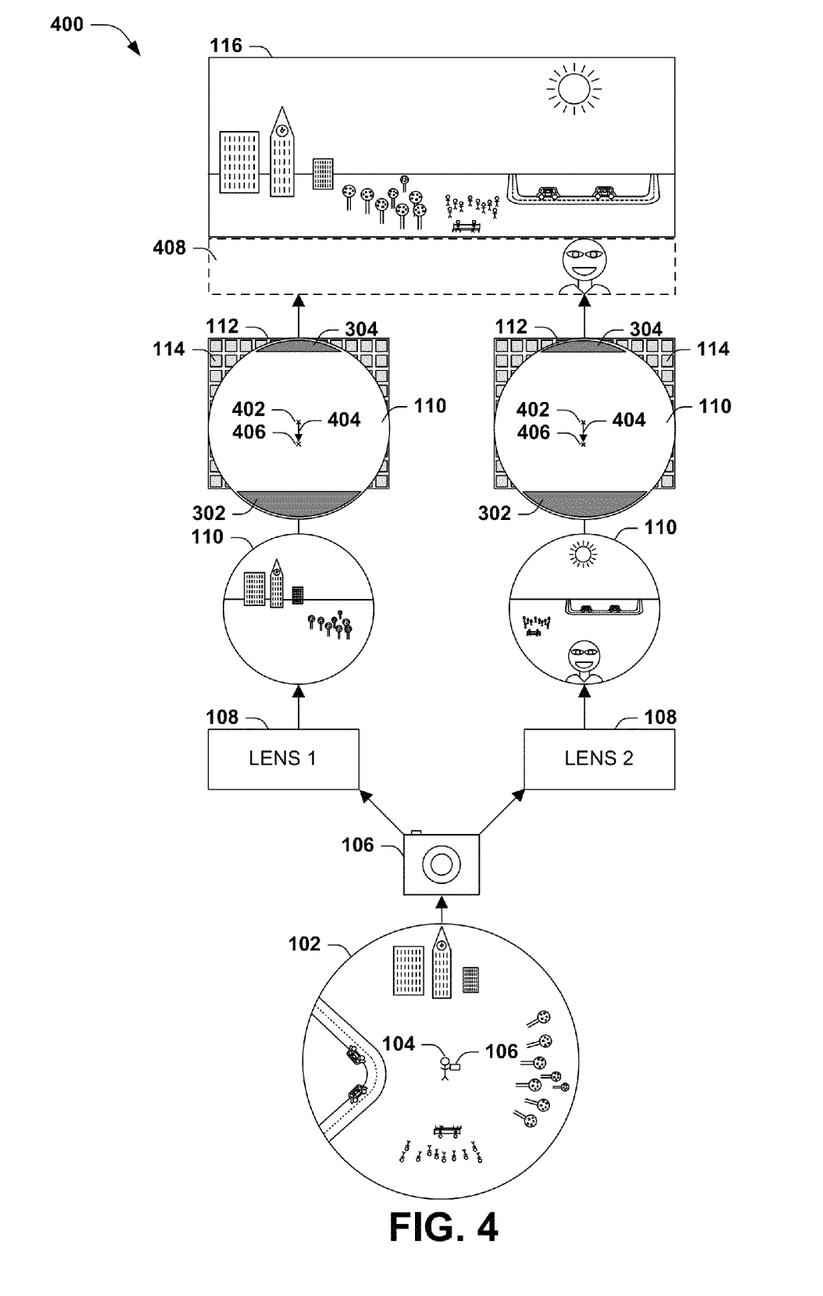
FIG. 4 is an illustration of an exemplary scenario featuring the generation of a composite image from a set of images captured by two lenses and projected with displacement onto two imagers in accordance with the techniques presented herein.

FIG. 4 presents an illustration of an exemplary scenario 400 featuring a camera 106 having lenses 108 oriented to capture a composite image 116 representing a scene 102 according to the techniques presented herein. In this exemplary scenario 400, the lenses 108 are configured to cast an image 110 upon an imager 112 to be sampled by an array of photosensitive elements 114. In a similar manner as the exemplary scenario 300 of FIG. 3, the image 110 is cast on the imager 112 with a size increasing the coverage of the imager 112, but creating a set of cropped areas However, in this exemplary scenario 400, the images 110 are cast on the imager 112 with a displacement 406 from the center 402 of the imager 112 by a displacement distance 404. This displacement 406 expands a first cropped portion 302 of the image 110 while reducing (and, in this exemplary scenario 400, eliminating) a second cropped portion 304 of the image 110. The displacement 406 results in a blind spot 408 in the composite image 116 corresponding to the first cropped portion 302, but the blind spot that may have been created by the second cropped portion 304 is reduced or eliminated. Moreover, the orientation of the lenses 108 may position this blind spot 408 with a portion of the composite image 116 that the user 104 may not have desired to capture, in particular the portion of the image 116 depicting the user 104, including the user's hand or a mounting apparatus. This lens orientation therefore maximizes the coverage of the imager 112 and the quality of the composite image 116 while cropping only an undesired portion of the images 110 in accordance with the techniques presented herein.

C. Exemplary Embodiments

The techniques presented herein may be embodied in many types of embodiments.

A first exemplary embodiment involves a camera 106 configured to generate a composite image 116. Such a camera 106 may comprise at least one imager 112, and at least two lenses 108 configured to focus an image 110 on at least one of the imagers 112. In particular, the orientation of each lens 108 may be selected to expand the image 110 to increase coverage of the imager 112 by the image 110 while creating at least two cropped portions that are not focused on the imager 112. Additionally, the orientation of each lens 108 may be selected to displace the image 110 from a center 402 of the imager 112 to expand a first cropped portion 302 while reducing at least one second cropped portion 304. The camera 106 may also comprise a composite image generating component that is configured to capture the images 110 of the lenses 108 using the respective imager 112, and to generate a composite image 116 from the images 110 captured by the respective imagers 112. A camera 106 having lenses 108 and imagers 112 oriented in such a manner may therefore maximize the coverage of the imager 112 and the resulting resolution and quality of the composite image 116 while cropping only a portion of the composite image 116 that a user 104 may not desire to be included, in accordance with the techniques presented herein.

A second exemplary embodiment involves a lens set that is mountable within a camera 106 having at least one imager 112. For example, a camera 106 may include a set of imagers 112, and a lens set comprising images 108 aligned in the manner provided herein may be mounted within the camera 106 in order to generate a composite image 116 in accordance with the techniques presented herein. In particular, this lens set may comprise at least two lenses 108, respective having a fixed rotationally symmetric orientation (e.g., where the orientation angle between any two consecutive lenses 108 is approximately equal to the orientation angle between any other two consecutive lenses 108), and a fixed orientation with respect to an imager when mounted in the camera 106. More particularly, the fixed orientation may be selected to focus the image 110 on the imager 112 by expanding the image 110 to increase coverage of the imager 112 by the image 110 while creating at least two cropped portions that are not focused on the imager 112, and displacing the image 110 from the center 402 of the imager 112 to expand a first cropped portion 302 while reducing at least one second cropped portion 304. By a set of lenses 108 oriented in this manner when mounted in the camera 106, the lens set may enable the capturing of composite images 116 with increased resolution and a consolidated cropped portion in accordance with the techniques presented herein.

Figure 5:
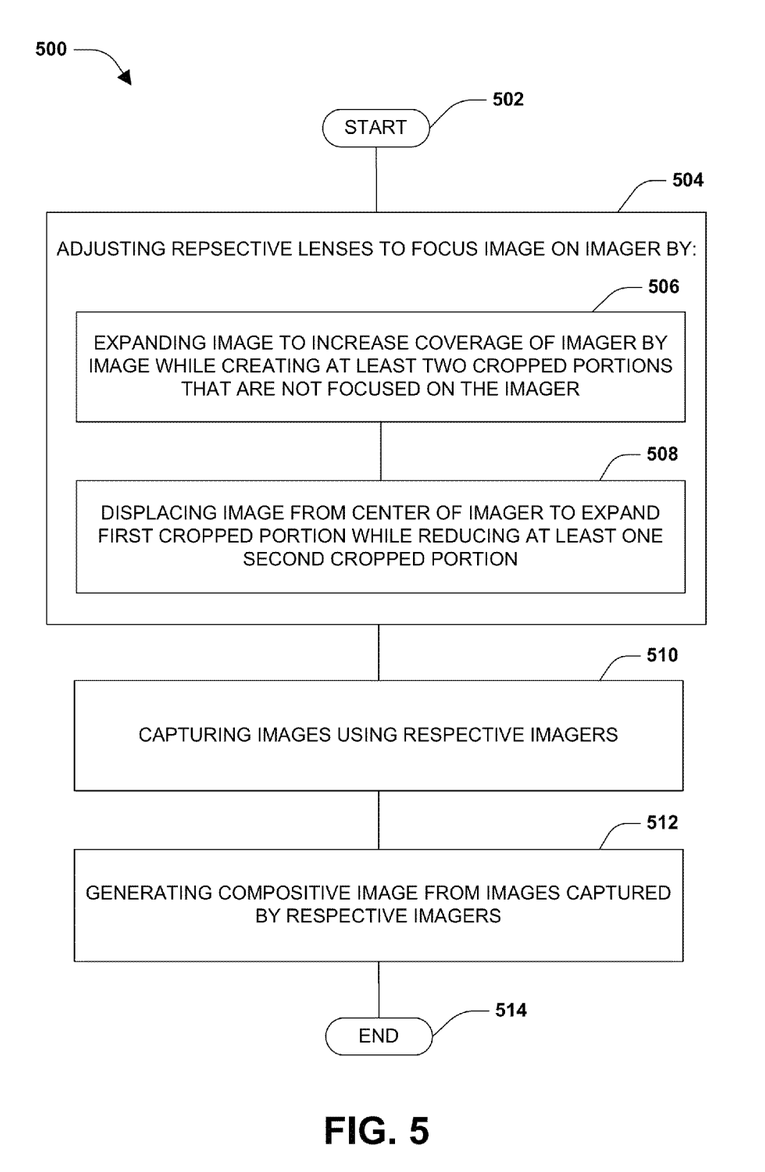
FIG. 5 is an illustration of an exemplary method of capturing an image with a set of lenses according to the techniques presented herein.

FIG. 5 presents an illustration of an exemplary scenario featuring a third embodiment of these techniques, involving an exemplary method 500 of generating a composite image 116 using a camera 106 having at least two lenses 108 respectively focusing an image 110 on at least one imager 112. The exemplary method 500 begins at 502 and involves adjusting 504 respective lenses 108 to focus the image 110 on an imager 112 by expanding 506 the image 110 to increase coverage of the imager 112 by the image 110, while creating at least two cropped portions that are not focused on the imager 112. The adjusting 504 of the lenses 108 also involves displacing 508 the image 110 from a center 402 of the imager 112 to expand a first cropped portion 302 while reducing at least one second cropped portion 304. The exemplary method 500 also involves capturing 510 the images 110 using the respective imagers 112, and generating 512 a composite image 116 from the images 110 captured by the respective imagers 112. By adjusting the lenses 108 with respect to the imagers 112 in this manner, the exemplary method 500 may enable the generating 512 of the composite image 116 having increased image quality while cropping a portion of the image 110 that may not be of interest to the user 104, and so ends at 514. These and other types of embodiments may be devised that incorporate the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of cameras. As a first such example, many classes of cameras may be utilized, such as analog or digital cameras; motion or still cameras; professional or amateur cameras; and standalone cameras or cameras implemented in another device, such as a computer or mobile phone. As a second such example, the cameras may be configured to capture various wavelengths of light, e.g., visible-light cameras capturing the visible spectrum; infrared cameras capturing the infrared portion of the spectrum; underwater cameras capturing the wavelengths of light that are typically visible underwater; and astronomical cameras capturing a broad swath of the electromagnetic spectrum. As a third such example, the camera may be configured to exclude some wavelengths of light; e.g., the camera may feature a polarized light source and/or polarizing filter that excludes wavelengths except along a particular polarity.

As a second variation of this first aspect, the techniques presented herein may be utilized with lens sets featuring various types and orientations of lenses 108. As a first such example, the techniques presented herein may be utilized with many types of lenses 108, including flat, curved, or fisheye lenses. As a second such example, the lenses 108 may be oriented as a two-dimensional array, with each lens capturing a portion of a two-dimensional scene 102. Alternatively, the lenses 108 may be oriented cylindrically, e.g., curving partially or completely about a first axis, and expanding linearly along a second axis, to create a cylindrical view of a scene 102, or spherically, e.g., curving along each of two axes in order to capture a fisheye view of a scene 102. Moreover, such lenses 108 may be arranged in various configurations; e.g., in a rotationally symmetric arrangement, the angle between any two consecutive lenses 108 is approximately equal to the angle between any two other consecutive lenses 108.

As a third variation of this first aspect, many types of imagers 112 may be utilized, such as charge coupled devices (CCDs) and complementary metal-oxide semiconductors (CMOSes). Additionally, the camera 106 may feature a single imager 112 configured to receive multiple images 110 from the respective lenses 108, or multiple imagers 112 configured to receive a partial or complete image 110 from one or more lenses 108. These and other types of cameras and lenses may be compatible with the techniques presented herein.

D2. Image Displacement on Imager

A second aspect that may vary among embodiments of these techniques relates to the manner of orienting a lens displacement of the image 110 on the imager 112.

As a first variation of this second aspect, respective lenses 108 may be oriented to displace the image 110 from the center of the imager 112 to expand a first cropped portion 302 that corresponds within the composite image 116 to the first cropped portion 302 of at least one other lens 108. As a first such example, if two lenses 108 respectively create an image 110 featuring a bottom portion that may not be of interest to the user 104, both lenses 108 may focus the image 110 on the imager 112 with a downward-oriented displacement 406, thus removing an entire bottom portion of the composite image 116 while providing higher resolution for the remainder of the composite image 116. As a second such example, if two or more lenses 108 are oriented to feature an overlapping portion (e.g., three 180-degree fisheye lenses each covering 180 degrees of the scene 102, thus providing 30 degrees of overlap on each side of the image 110 with a corresponding 30 degrees of the same portion of the scene 102 provided by another lens 108), and if one portion of the scene 102 is of less interest to the user 104, then two or more lenses 108 may be oriented with a displacement resulting in a cropping of the overlapping portion of each image 110 that the user 104 is not interested in capturing. Some examples of such less interesting portions of the scene 102 that the user 104 may wish to crop out include a blocked portion of the composite image, such as the location of a user 104 who is close to at least one lens 108 (e.g., a close-up portion of the hand of the user 104 holding the camera 106, or an area behind the viewfinder where the user 104 is likely standing); the location of a mounting apparatus used to steady the camera 106; or the location of a camera body portion of the camera 106 that is otherwise visible within the composite image 116. Moreover, the camera 106 may indicate to the user 104 the area of the blocked portion that the lenses 108 are configured to crop from the composite image 116 (e.g., markings on the exterior of the camera 106 indicating how the user 104 may hold the camera 106 such that the user's hand is cropped out of the composite image 116). An example of this technique is illustrated in FIG. 4, wherein both lenses 108 are oriented to expand a first cropped portion 302 comprising a bottom portion, resulting in a blind spot 408 comprising the bottom row of the composite image 116 that is entirely cropped, while providing enhanced resolution for the remainder of the composite image 116.

As a second, converse variation of this second aspect, the displacement 406 of respective lenses 108 may be selected such that a first cropped portion 302 of the image 110 that is cropped by a first lens 108 corresponds with a second cropped portion 304 of the image 110 of a second lens 108 that is reduced or eliminated. That is, if two or more lenses 108 capture an overlapping portion of the scene 102, a first lens 108 may be oriented with the overlapping portion comprising the first cropped portion 302 that is cropped from the scene 102, and a second lens 108 may be oriented with the overlapping portion comprising the second cropped portion 304 that is captured due to the displacement 406 of the image 110. When oriented in this manner, the first cropped portion 302 that is not captured by the first lens 108 may be captured by the second lens 108 as the second cropped portion 304, and, in fact, may be captured in higher resolution than if the first lens 108 had not been displaced and had captured the first cropped portion 302. In this manner, the entire composite image 116 may be captured with a reduced, or in some cases eliminated, blind spot 408.

Figure 6:
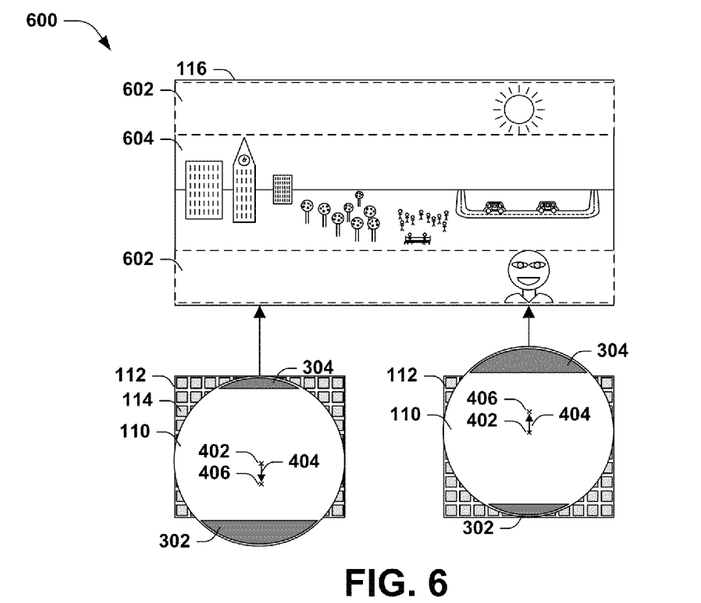
FIG. 6 is an illustration of an exemplary scenario featuring an opposing displacement of a set of lenses.

FIG. 6 presents an illustration of an exemplary scenario 600 featuring an opposing displacement 406 of images 110 on two images 112. In this exemplary scenario 600, each of two 180-degree fisheye lenses 108 focuses an image 110 on an imager 112 with a displacement 406 that may otherwise create a blind spot 408 in the composite image 116. However, if each lens 108 is oriented with a displacement 406 in the opposite direction, then the blind spot 408 may be reduced. For example, a first blind spot 602 comprising the area near the top of the composite image 116 may be at least partially captured as the second cropped portion 304 captured by the first lens 108; and a second blind spot 602 comprising the area near the bottom of the composite image 116 may be at least partially captured as the second cropped portion 304 captured by the second lens 108. In this manner, the displacement 406 of the lenses 108 may be selected to reduce or eliminate the blind spot 408 created by the techniques presented herein.

As a third variation of this second aspect, the orientation of a lens 108 creating a displacement 406 of an image 110 on the imager 112 may be adjusted in view of respective properties of the imager 112. As a first example, some imagers 112 may present an uneven density of photosensitive elements 114 with a higher density in the center 402 and lower densities near the periphery (e.g., resembling the arrangement of photosensitive structures in the human eye). As a second example, the lens 108 may provide an image 110 with a gradient of image quality; e.g., a curved or fisheye lens 108 may present a higher-quality image 110 near the center 402, where the lens 108 is comparatively flat, as compared with the edges, where the lens 108 is steeply curved and presents significant spherical aberration. In these and other examples, the displacement of the 406 of the image 110 may be adapted to take this difference into consideration; e.g., if the center 402 of the lens 108 presents a higher-quality image 110, then the displacement distance 404 may be shortened such that the image 110 is focused closer to the center 402 of the lens 108. That is, there may be a tradeoff between expanding the image 110 and providing a displacement 406 on the imager 112 in order to raise the resolution of the captured image 110, and focusing the image 110 closer to the center 402 of the imager 112 in order to maximize the use of the higher-quality portions of the imager 112 and/or lens 108.

Figure 7:
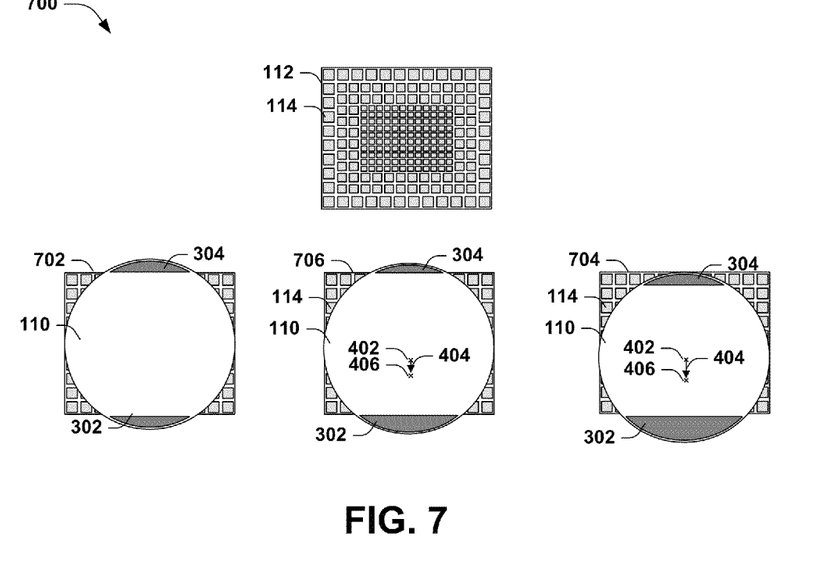
FIG. 7 illustrates an exemplary computing environment wherein one or more of the provisions set forth herein may be implemented.

FIG. 7 presents an illustration of an exemplary scenario 700 featuring an imager 112 having a higher density of photosensitive elements 114 near the center 402 than near the periphery. This exemplary scenario 700 illustrates a tradeoff in the orientation of the lenses 108 to cast the image 110 on the imager 112 with variable degrees of displacement 406. A first example 702 provides no displacement 406, resulting in significant cropping of the image (or, alternatively, diminished coverage of the imager 112). A second example 704 presents a significant displacement 406 of the image 110, causing the first cropped portion 302 to be considerably expanded and the second cropped portion 304 to be eliminated, but shifts the image 110 away from the center 402 of the imager 112 having the highest density of photosensitive elements 114. A third example 706 presents an intermediate point along this tradeoff, where a positive displacement distance 404 that is shorter than the displacement distance 404 in the right example, provides a significant reduction of the second blind spot 304 and high coverage of the imager 112, while also adjusting the image 110 toward the center 402 of the imager 112 in order to utilize the higher density of photosensitive elements 114 provided therein. In this manner, an intermediate point may be selected between the first example 702 and the second example 704 in view of various properties of the camera wherein the techniques presented herein are utilized.

As a fourth variation of this second aspect, the orientation of the lenses 108 may be adjustable, e.g., in view of a user selection by a user 104. For example, the camera 106 may provide several options for orienting the lenses 108, e.g., presenting a blind spot 408 near the bottom the composite image 116 (i.e., expanding the image 110 on the imager 112 and inducing a displacement 406 in a first direction); presenting a blind spot 408 near the top of the composite image 110 (i.e., expanding the image 110 on the imager 112 and inducing a displacement 406 in a second direction); presenting blind spots 408 at both the bottom and the top of the composite image 110 (i.e., expanding the image 110 on the imager 112 but not inducing a displacement 406); or presenting no blind spots 408 (i.e., neither expanding the image 110 nor inducing a displacement 406). The orientation of the lenses 108 may be adapted according to the user selection of the user. These and other variations in the orientation of the lenses may be implemented by those of ordinary skill in the art while implementing the techniques presented herein.

E. Computing Environment

Figure 8:
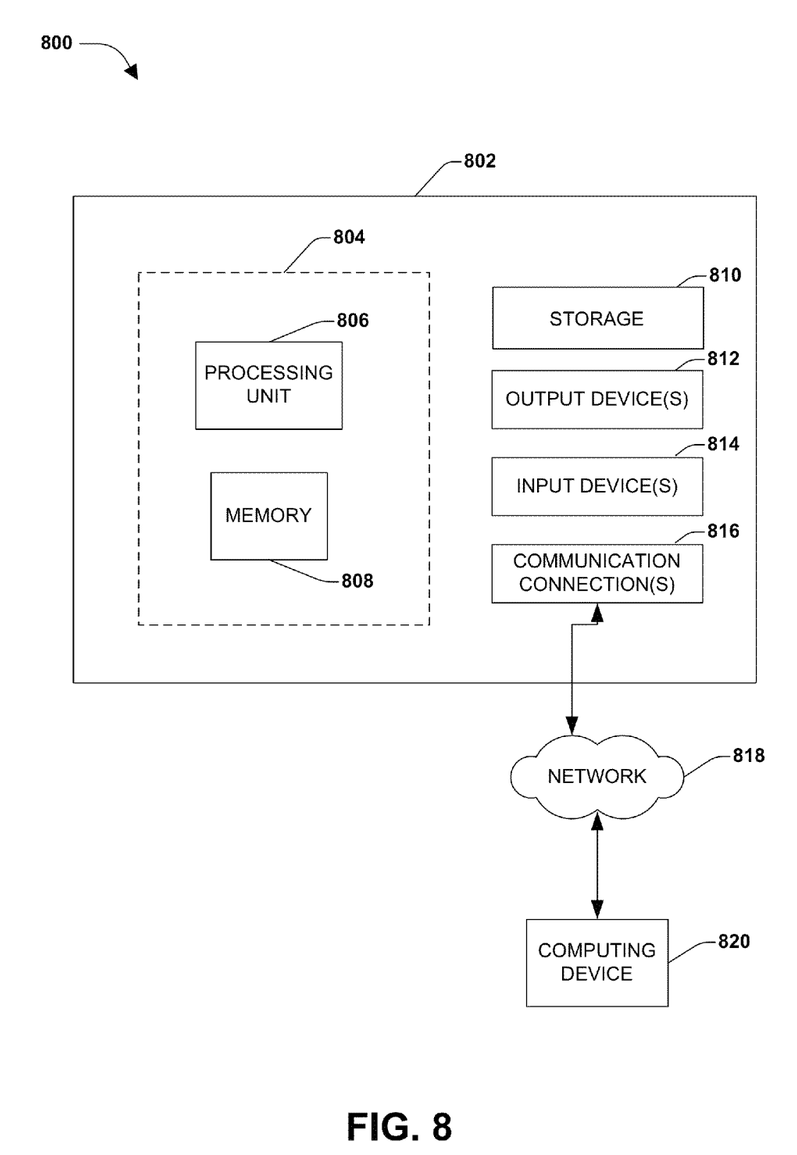
FIG. 8 presents an illustration of an exemplary computing environment wherein the techniques presented herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A camera configured to generate a composite image, comprising:
   at least one imager, and
   at least two lenses respectively configured to focus an image on an imager by:
      expanding the image to increase coverage of the imager by the image while creating at least two cropped portions that are not focused on the imager, and
      displacing the image from a center of the imager to expand a first cropped portion while reducing at least one second cropped portion; and
   a composite image generating component configured to:
      capture the images of the lenses using the respective imager, and
      generate a composite image from the images captured by the respective imagers.

2. The camera of claim 1, the displacing comprising, for respective lenses, displacing the image from the center of the imager to expand a first cropped portion corresponding within the composite image to the first cropped portion of at least one other lens.

3. The camera of claim 2:
   the composite image comprising an interesting image portion; and
   displacing the image to expand coverage of the image portion on the first imager portion comprising: displacing the image to expand coverage of the interesting image portion on the first imager portion having the higher imager resolution.

4. The camera of claim 3:
   the imager having an uneven imager density, comprising a first imager portion having a higher imager resolution than a second imager portion; and
   the displacing further comprising: displacing the image to expand coverage of an image portion on the first imager portion having the higher imager resolution.

5. A lens set mountable within a camera having at least one imager, the lens set comprising:
   at least two lenses, respective lenses having a fixed rotationally symmetric orientation with respect to the other lenses and a fixed orientation with respect to an imager, the fixed orientation selected to focus an image on an imager by:
      expanding the image to increase coverage of the imager by the image while creating at least two cropped portions that are not focused on the imager, and
      displacing the image from a center of the imager to expand a first cropped portion while reducing at least one second cropped portion.

6. The lens set of claim 5, the displacing comprising, for respective lenses, displacing the image from the center of the imager to expand a first cropped portion corresponding within the composite image to the first cropped portion of at least one other lens.

7. The lens set of claim 5:
   the composite image comprising an interesting image portion; and
   displacing the image to expand coverage of the image portion on the first imager portion comprising: displacing the image to expand coverage of the interesting image portion on the first imager portion having the higher imager resolution.

8. The lens set of claim 7:
   the imager having an uneven imager density, comprising a first imager portion having a higher imager resolution than a second imager portion; and
   the displacing further comprising: displacing the image to expand coverage of an image portion on the first imager portion having the higher imager resolution.

9. A method of generating a composite image using a camera having at least two lenses respectively focusing an image on at least one imager, the method comprising:
   adjusting respective lenses to focus the image on an imager by:
      expanding the image to increase coverage of the imager by the image while creating at least two cropped portions that are not focused on the imager; and
      displacing the image from a center of the imager to expand a first cropped portion while reducing at least one second cropped portion;
   capturing the images using the respective imagers; and
   generating a composite image from the images captured by the respective imagers.

10. The method of claim 9:
    respective lenses comprising a curved lens; and
    the composite image comprising a spherical image.

11. The method of claim 10, the lenses oriented within the camera according to a rotationally symmetric orientation.

12. The method of claim 9, the displacing comprising, for respective lenses, displacing the image from the center of the imager to expand a first cropped portion corresponding within the composite image to the first cropped portion of at least one other lens.

13. The method of claim 12, the first cropped portion comprising a blocked portion of the composite image.

14. The method of claim 13:
    the camera operated by a user who is close to at least one lens; and
    the blocked portion comprising a location of the user within the composite image.

15. The method of claim 13:
    the camera coupled with a mounting apparatus; and
    the blocked portion comprising a location of the mounting apparatus within the composite image.

16. The method of claim 13:
    the camera comprising a camera body portion that is visible within the composite image; and
    the blocked portion comprising a location of the camera body portion within the composite image.

17. The method of claim 12, further comprising indicating to the user the blocked portion of the composite image.

18. The method of claim 9, the displacing comprising, for respective lenses, displacing the image from the center of the imager to expand a first cropped portion corresponding within the composite image to the second cropped portion of at least one other lens.

19. The method of claim 9:
    the imager having an uneven imager density, comprising a first imager portion having a higher imager resolution than a second imager portion; and
    the displacing further comprising: displacing the image to expand coverage of an image portion on the first imager portion having the higher imager resolution.

20. The method of claim 19:
    the lenses comprising an adjustable orientation providing an adjustable displacement of the image on the imager; and
    the method comprising: upon receiving a user selection of a user indicating a selected adjustable displacement;

setting the lenses to an adjustable orientation resulting in the selected adjustable displacement of the image on the imager.

* * * * *